United States Patent Office 3,044,998
Patented July 17, 1962

3,044,998
BORATED MONOMERS AND POLYMERS
Donald D. Emrick, Shaker Heights, and Samuel M. Darling, Lyndhurst, Ohio, assignors to The Standard Oil Company, Cleveland, Ohio, a corporation of Ohio
No Drawing. Filed Nov. 13, 1958, Ser. No. 773,559
4 Claims. (Cl. 260—89.5)

This invention relates to certain monomeric, borated, acrylated, acylated polyhydroxy compounds and polymers thereof. The monomers can be polymerized to form polymers which are resistant to hydrolysis and which are suitable for many purposes where boron-containing hydrolysis-resistant polymers are desired, such as motor oil additives and protective coatings.

The desirability of incorporating boron in an oil is well known in the art and the primary problem facing the art is the introduction of the boron in the form of a compound that will remain stable in the oil and, more particularly, will not hydrolyze and precipitate boric acid.

In the publication entitled "Research on Boron Polymers," Part II, published in May 1955, by the Wright Air Development Center, WADC Technical Report 55-26 (PB 11892), the introduction to the discussion states on page 2 that: "Most polymers based on esters or amides of boric acid or boronic acids appear to be too susceptible to hydrolysis to offer any promise of practical value."

In the same publication, the abstract thereof, on page iii, states: "Esters and polymers based on tricovalent boron are hydrolytically unstable."

Contrary to the understanding in the art as expressed in the above quotations, we have discovered that the polymers produced in accordance with our invention are resistant to hydrolysis.

The monomers produced in accordance with our invention have the following general formula:

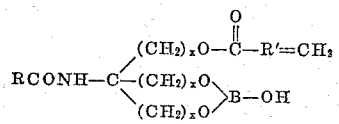

where R is an alkyl or alkenyl radical of from 1 to 21 carbon atoms, $x$ is a small whole number of from 1 to 3, preferably 1, and R' is

or

The polymers thereof cannot be assigned any definite structures because the polymerization may be by cross-linkage through the tricovalent boron valences as well as through the acrylic double bond.

When R is from 11 to 21, preferably from 13 to 17 carbon atoms, the monomers are primarily suitable as lubricating oil additives. Values of R less than 11 give extensive cross-linkage, which is sufficient to prevent solution in the oil.

When R is from 1 to 10, preferably from 1 to 8, the monomers can be polymerized to deposit an irreversible highly cross-linked resinous film, and in this way, a film may be deposited from the solution on any surface desired to be covered and contrary to the usual manner of forming films by the evaporation of a solvent. In this way, metal surfaces may be coated to protect them against corrosion, and non-metallic inflammable materials can be coated to render them more resistant to fire due to the boron content of the polymer.

The monomers are prepared by reacting a tris(hydroxyl alkyl) aminomethane with a fatty acid or fatty acid chloride to form the amide.

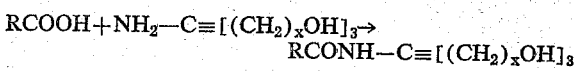

where R is an alkyl radical of 1 to 21 carbon atoms, and $x$ is a small whole number of from 1 to 3. One of the hydroxy groups is then esterified with acrylic or methacrylic acid or acid chloride to give an intermediate of the following structure:

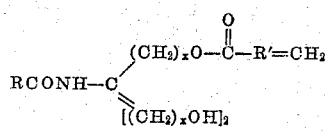

where R' is

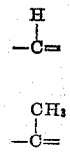

or

This intermediate is then reacted with boric acid to give the monomer of the formula defined heretofore:

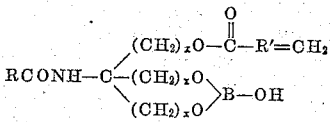

The synethesis is straightforward utilizing conventional reaction conditions. If a fatty acid chloride or acrylic or methacrylic acid chloride is used, an amine may be employed to absorb the liberated hydrogen chloride. Any inert solvent can function as the reaction medium.

The following is the best mode we contemplate for preparing the monomer:

The apparatus for conducting the reaction is a glass vessel fitted with a mechanical stirrer, a reflux condenser, a funnel for the addition of liquid, and means for heating the vessel externally.

34.9 parts of tris(hydroxymethyl) aminomethane, 58.3 parts of triethylamine and 300 parts of chloroform were placed in the vessel and heated to refluxing temperature. To this, 86.4 parts of oleyl chloride was added slowly during refluxing and stirring over a period of ½ hour and refluxing and stirring continued for an additional 1½ hours.

The triethylamine is not reactive except with the hydrogen chloride liberated in the reaction to form triethylamine hydrochloride. The chloroform functions solely as an inert solvent.

The reaction vessel was then cooled to room temperature. A solution of 31 parts of acrylochloride in 75 parts of chloroform was then added with stirring over a period of 20 minutes at room temperature. Refluxing with stirring was then started and continued for one hour, following which the chloroform was distilled off and 245 parts of benzene was added. This precipitated the triethylamine hydrochloride which was then filtered off.

The liquid reaction product in the benzene was then returned to the reaction vessel to which was added 36 parts of powdered boric acid and the mixture heated under refluxing conditions, with stirring. The water liberated by the boration was distilled over with the benzene azeotropically and heating was continued until no more water was liberated. The product was then filtered to remove excess unreacted solid boric acid and the filtrate was then heated to remove the excess benzene to yield a clear viscous product. The product was inhibited for storage by the addition of 0.1 part of para-dimethoxybenzene.

A polymer formed from this monomer is a lubricating oil additive. The polymerization can be accomplished in situ in the lubricating oil by heating in the presence of air or by the addition of a peroxide catalyst. While the polymer is soluble enough in oil that it may be polymerized first and then dissolved in the oil, we prefer to polymerize the monomer in an oil base suitable for incorporation in the final lubricating oil blend, and in this manner to make a concentrate of the polymer in the base oil. This is then added to the lubricating oil blend in an amount to give the appropriate concentration of the polymer.

The concentrate was prepared by adding one part of the monomer above prepared to 4 parts of a white oil having a viscosity of 44.8 SSU at 210° F. and a viscosity index of 83 and heating at 150° C. with air-blowing for 1.0 hour. The concentrate was then incorporated in a dewaxed furfural solvent extracted lubricating oil having a viscosity of 46.9 SSU at 210° F. in an amount to provide 5.9% of the polymer and a boron content of 0.0955%.

The base oil (before the addition of the polymer) had a carbon black dispersancy rating of 0.2 and a viscosity index of 103. The blend had a carbon black dispersancy of 6.7 and a viscosity index of 112 showing that the polymer has viscosity index improving properties and dispersancy properties. The resulting blend was tested for hydrolytic stability by bubbling moisture-saturated air in an amount of 100 liters per hour per liter of oil for 24 hours and it was found that the boron content of the oil blend was retained.

The same polymer was incorporated in two other base oils and the results above given, together with the properties of the other two base oils, are shown in the following table:

| Base Oil | Amount of Polymer, Percent | Carbon Black Dispersancy | Viscosity Index |
|---|---|---|---|
| Neutral oil, 38.7 SSU at 210° F. | 0 | 0.2 | 59 |
| Do. | 5.9 | 6.9 | 86 |
| White oil, 44.8 SSU at 210° F. | 0 | 0.2 | 83 |
| Do. | 5.9 | 5.8 | 96 |

The carbon black dispersancy test is a measure of the ability of the oil to hold carbon black dispersed. The oil to be tested is made up as a 5% solution thereof in benzene, and 100 ml. of the solution is placed in a glass-stoppered graduate. Carbon black in increments of 0.2 gm. is added to the solution, which is then shaken for fifteen seconds and permitted to stand for five minutes in front of a light source and the contents observed for a "break point." This point is seen as a thin upper layer of completely transparent liquid containing no carbon black particles. If no break point is observed, additional increments of carbon black are added until there is a break point. The largest amount of carbon black which does not produce a break point is recorded as the result of the test. The test has been calibrated against various additive concentrations of dispersant additives in oil and is a measure of the dispersant or detergent properties of an oil.

The polymers of the invention can be used with any petroleum hydrocarbon oil of lubricating viscosity. The S.A.E. viscosities for lubricating oils range from #10 to #70. The neutral oils and refined oils, such as acid-treated and solvent-extracted oils, are equally useful in the compositions. The oils may be blended from suitable bright stocks and finished neutral or refined oils of light or heavy viscosities. Further information on the oils suitable and methods of making them is described in chapter V of the book by Georgi, entitled "Motor Oils and Engine Lubricating," published by Reinhold Publishing Corp., New York, 1950.

Relatively large amounts of the boron polymer are preferable in oils as compared to the amount utilized in gasoline and the amount of the polymer preferably is such that the boron content in the oil is at least 0.05%. Use in amounts to provide in excess of 0.5% boron usually cannot be justified economically.

When the above oils were used in the crankcase of an internal combustion engine operating for a period of 72 hours on non-boron containing gasoline and the engine was dismantled and examined, deposits in the combustion chamber were found to contain boron with the attendant advantages of boron in the deposit as is pointed out, for instance, in Patent 2,741,548.

The following illustrates the best mode we contemplate for making monomers suitable for use in forming a protective coating polymer. The above example was repeated except that instead of oleyl chloride 2-ethylhexoyl chloride was employed, and the monomer was worked up in the same manner as previously described.

To form the polymer, two grams of the monomer were incorporated in 200 grams of 50:50 n-octane-toluene and to it were added 0.05 gram of benzoyl peroxide as a catalyst for polymerization. Strips of ordinary cellulosic cardboard were inserted in the solution and the polymer was formed in situ and precipitated on or in the cardboard. Following the precipitation, the cardboard was removed and the solvent permitted to evaporate at room temperature. The resulting cardboard was found to have been waterproofed and rendered less flammable.

We claim:

1. A compound having the following general formula:

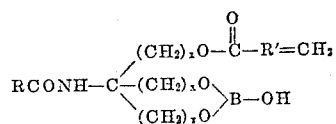

where R is a radical selected from the group consisting of unsubstituted alkyl and alkenyl radicals of from 1 to 21 carbon atoms, $x$ is a small whole number of from 1 to 3 and R' is selected from the group consisting of $$\begin{array}{cc} \overset{H}{\underset{|}{-C-}} & \overset{CH_3}{\underset{|}{-C=}} \\ & \text{and} \end{array}$$

2. Homopolymers of the compound of claim 1 polymerized through the terminal vinyl double bond.

3. Homopolymers of the compound of claim 2 in which R is $C_{13}$ to $C_{17}$.

4. Homopolymers of the compound of claim 2 in which R is $C_1$ to $C_8$.

References Cited in the file of this patent

UNITED STATES PATENTS

| | | |
|---|---|---|
| 2,052,192 | Piggott | Aug. 25, 1936 |
| 2,441,063 | Gilmann | May 4, 1948 |
| 2,488,034 | Pingree et al. | Nov. 15, 1949 |
| 2,791,574 | Lanham | May 7, 1957 |
| 2,795,548 | Thomas et al. | June 11, 1957 |
| 2,811,469 | Costello | Oct. 29, 1957 |
| 2,813,830 | Trautman | Nov. 19, 1957 |
| 2,824,861 | Conbere et al. | Feb. 25, 1958 |

FOREIGN PATENTS

| | | |
|---|---|---|
| 642,414 | Great Britain | Sept. 6, 1950 |